Nov. 11, 1952 D. BRODY 2,617,324
COMBINED CONFECTION AND WHISTLE
Filed March 13, 1950

INVENTOR.
David Brody
BY Sigmund Herzog
attorney.

Patented Nov. 11, 1952

2,617,324

UNITED STATES PATENT OFFICE 2,617,324

COMBINED CONFECTION AND WHISTLE

David Brody, Clinton, Mass., assignor to Van Brode Milling Co., Inc., Clinton, Mass., a corporation of Massachusetts Application March 13, 1950, Serial No. 149,302

3 Claims. (Cl. 84—330)

The present invention relates to new and useful improvements in confection, and more particularly to the type known as lollypops, wherein a lump of candy or the like is mounted on a stick or support.

One of the objects of the present invention is to provide, as a new article of manufacture, a confection comprising an edible member and a stick or support for the edible member; the stick or support constituting a musical toy, preferably a wind instrument, the operation of which is modified by said edible member.

Another object of the invention is to so construct the musical toy that, after the edible member of the combination has been consumed, it will continue to serve as a useful article of amusement.

A still further object of the invention is to provide a combined confection and musical instrument which is inexpensive to manufacture, attractive in appearance, and which readily lends itself to quantity production.

Figure 1:
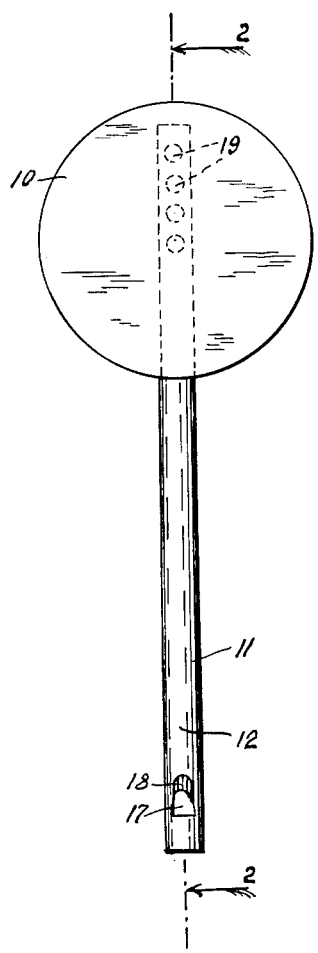
Figure 2:
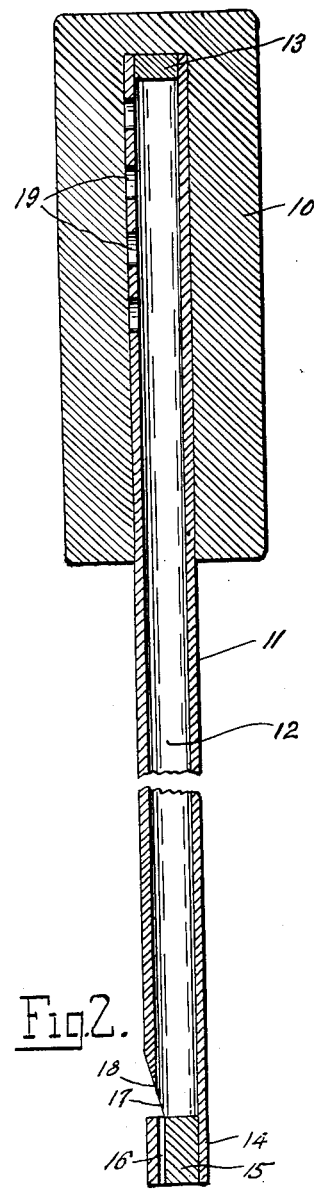

The above and other objects will be more readily understood by reference to the following description and accompanying drawings, which illustrate one of the many possible embodiments of the invention and in which:

Figure 1 is a plan view of a confection constructed in accordance with this invention; and Figure 2 is a section taken on line 2—2 of Figure 1, on a larger scale.

The lollypop consists of an edible portion 10, in the form of a solid mass of candy, in which is embedded one end of a support 11. This support constitutes a mechanical contrivance for the production of musical sounds. More specifically, it is of the wind instrument type, in which sound is due to the vibration of a column of air. The instrument comprises a tube 12 which is closed at its embedded end by a plug 13, and provided at its opposite free end with any suitable or preferred form of mouth-piece 14, whereby air may be blown into the tube. The mouth-piece includes a plug 15, arranged within the tube and being of a configuration to provide a mouth-orifice 16 for the entry of the operating air into the tube. In front of and adjacent to the exit end of the orifice 16 is formed in the tube a vent 17. The vent is cut into the tube to sharply bevel the wall of the latter, thereby presenting a thin reed 18, which is adapted to be vibrated by air issuing from the orifice 16. A series of spaced, alined holes 19 is formed in the embedded end of the tube in rear of its plug 13. These holes are normally covered by the candy portion of the lollypop.

The primary purpose of the tube 12 is to serve as a means by which the lollypop is held by the user. At the same time it functions as an ordinary whistle while the holes 19 are covered by the candy portion 10 of the confection. As the candy is being consumed by the eater, the row of holes 19 is gradually uncovered. Assuming that the sucking or eating is started at the top end of the candy piece and continued toward the bottom, it is obvious that the holes 19 are uncovered one after the other, beginning with the hole next to the plug 13. After the first hole has been uncovered, the whistle tone will differ from the one produced prior to the exposure of the first hole, and different tones will be obtained after each successive exposure of a hole in the series. The candy portion of the confection serves thus, as it is being consumed, to vary the size of the air space between the mouth-piece of the tube 12 and the row of holes 19, as the latter are being uncovered, step by step.

After the candy has been eaten, the handle of the confection is utilized as a musical instrument, the user substituting the fingers of one hand for the candy portion of the confection, the fingers serving to permit or block, as the case may be, the flow of air through any selected hole or group of holes 19.

From the foregoing it is evident that by the present invention there has been provided a confection embodying a support or handle having novel features, co-operating with the candy portion of the confection to accomplish the desired result.

What I claim is:

1. As a new article of manufacture, a confection comprising an edible member and a support therefor, said support being in the form of a tube having one of its ends embedded in said edible member, said tube forming part of a musical wind instrument and having at its free end a mouth-piece, and a reed on said tube co-operating with said mouth-piece, the embedded portion of said tube having a series of spaced holes normally covered by said edible member.

2. As a new article of manufacture, a confection comprising an edible member and a support therefor, said support being in the form of a tube having one of its ends embedded in said edible member, said tube forming part of a musical wind instrument and having at its free end a mouth-piece, and a reed on said tube co-operating with said mouth-piece, the embedded portion of said tube having a row of fingering holes which are gradually uncovered as the edible member is being consumed.

3. As a new article of manufacture, a confection comprising an edible member and a tubular support therefor, said support having one of its ends embedded in said edible member and constituting the tube of a musical wind instrument, and a mouth-piece and reed on the free end of said support, the embedded portion of said support having a row of fingering holes which are gradually uncovered as the edible member is being consumed.

DAVID BRODY.

REFERENCES CITED

The following references are of record in the file of this patent:

UNITED STATES PATENTS

| Number | Name | Date |
|---|---|---|
| 2,156,482 | Robb | May 2, 1939 |

FOREIGN PATENTS

| Number | Country | Date |
|---|---|---|
| 8,411 | Switzerland | May 18, 1894 |